Figure 1:
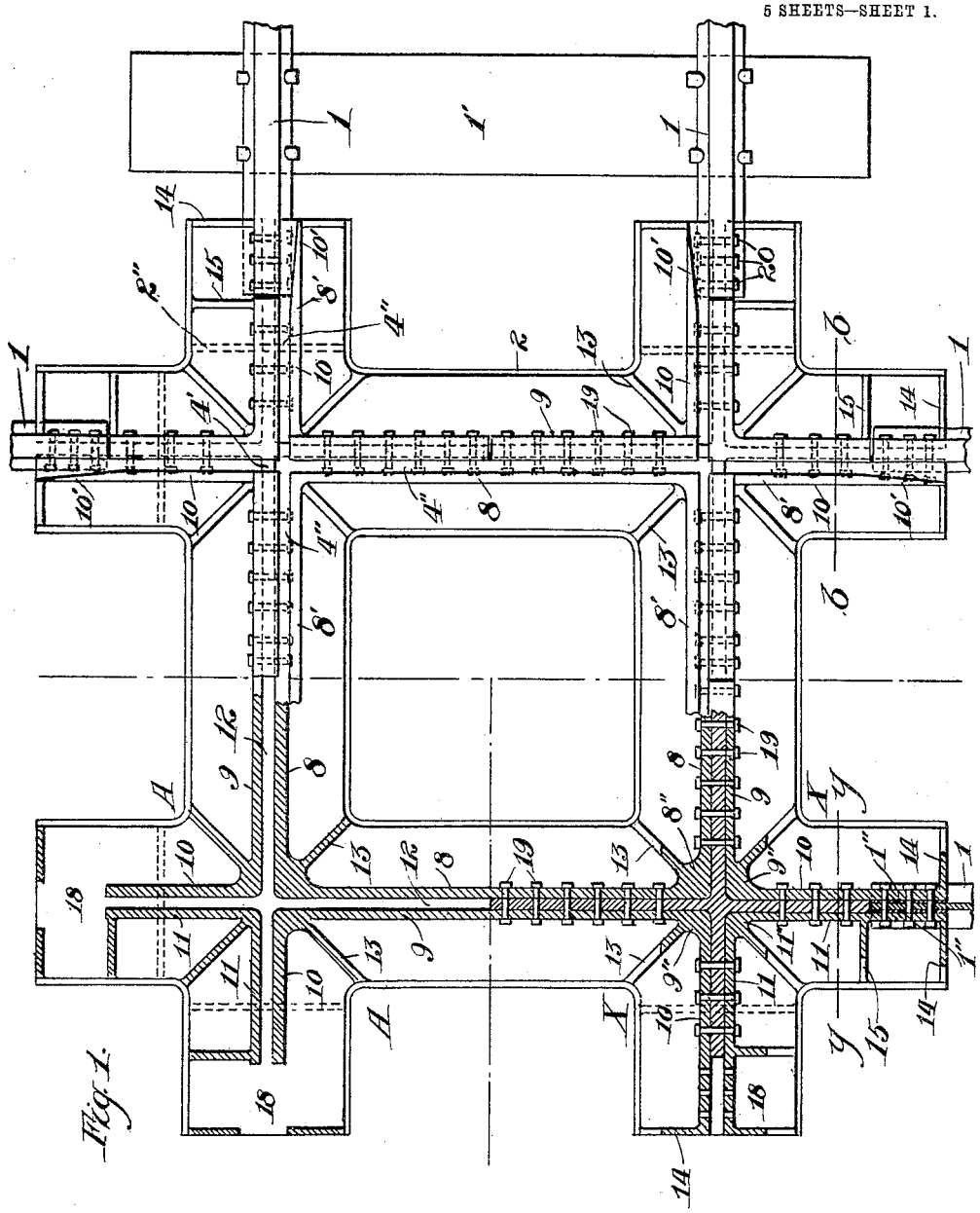

O. F. JORDAN.
RAILWAY CROSSING.
APPLICATION FILED DEC. 4, 1908.

911,994.

Patented Feb. 9, 1909.

Witnesses:
Arthur O. Nelson
John R. Lefevre

Inventor:
Oswald F. Jordan

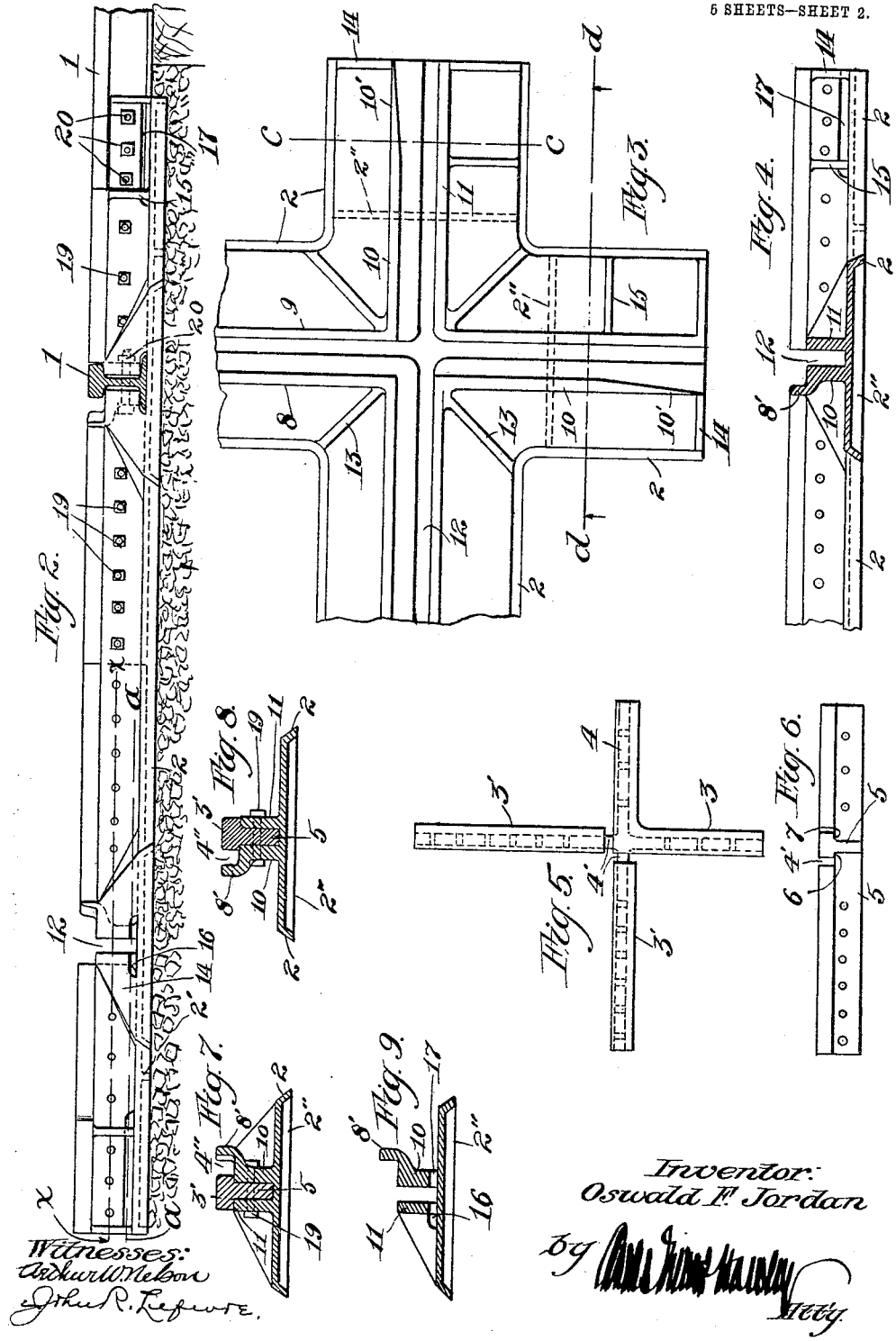

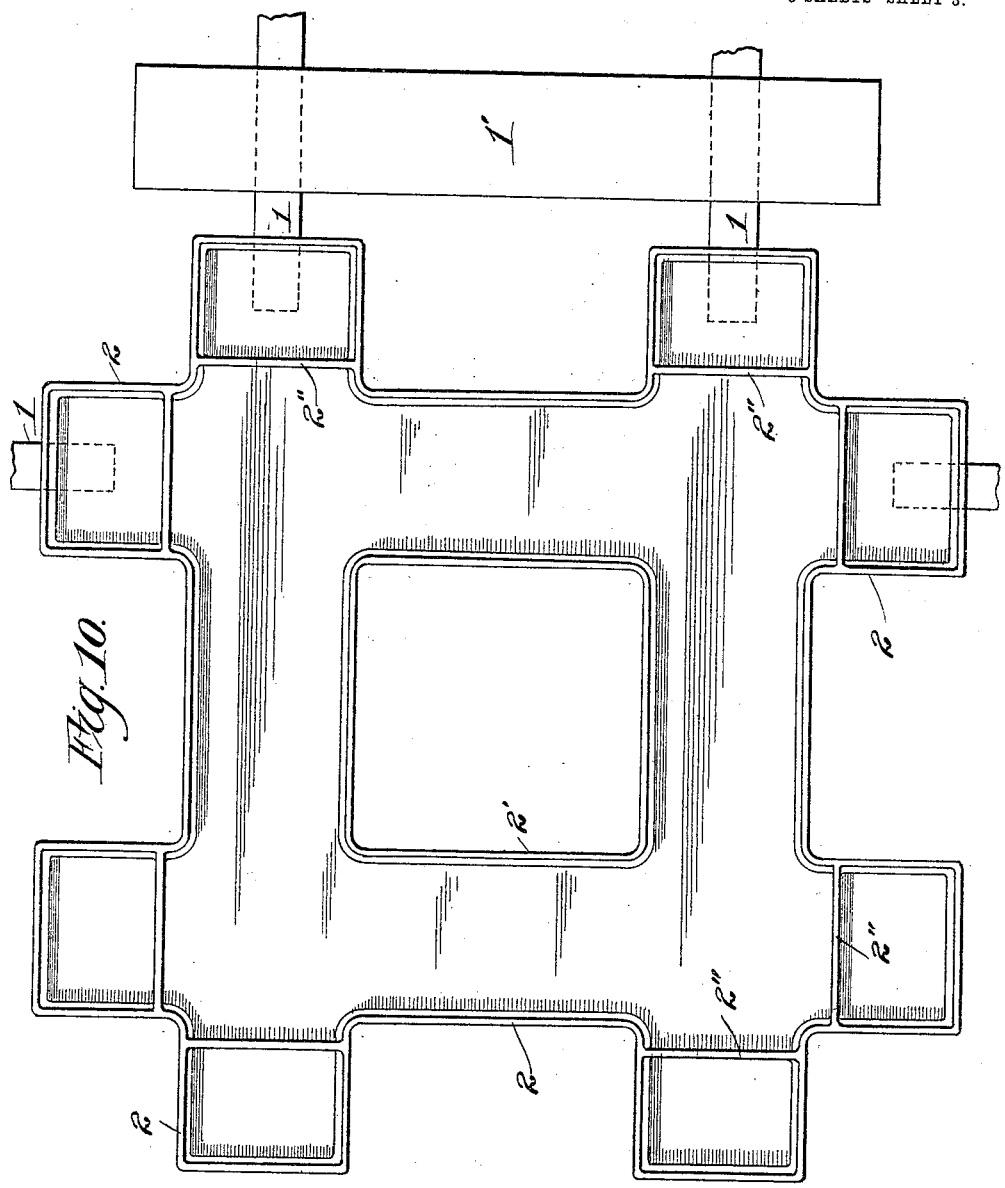

O. F. JORDAN.
RAILWAY CROSSING.
APPLICATION FILED DEC. 4, 1908.
911,994.
Patented Feb. 9, 1909.
5 SHEETS—SHEET 4.
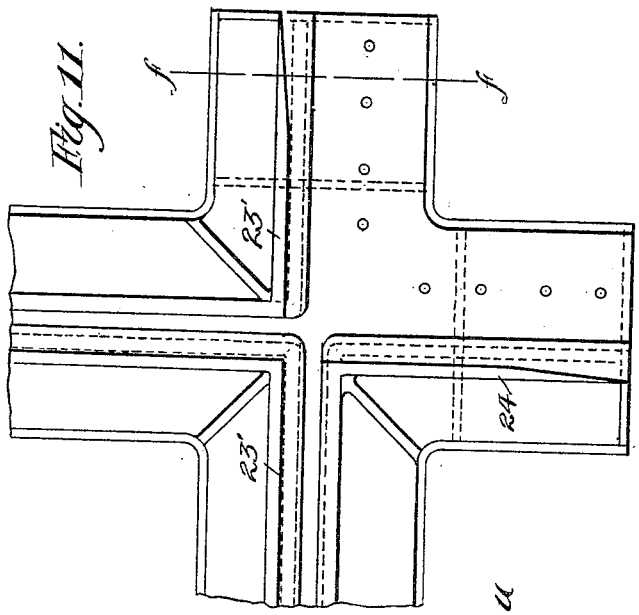
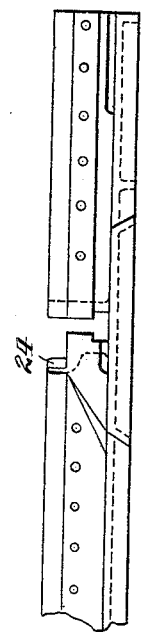
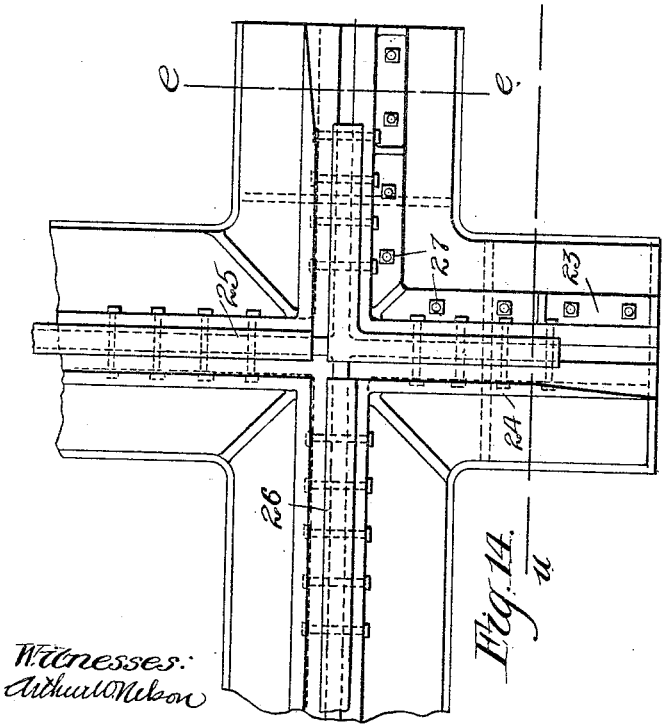
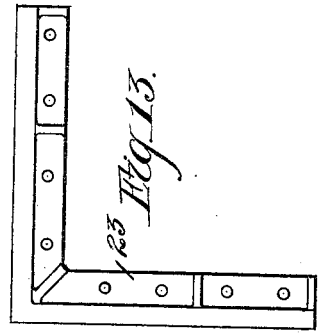
Witnesses:
Inventor:
Oswald F. Jordan

O. F. JORDAN.
RAILWAY CROSSING.
APPLICATION FILED DEC. 4, 1908.
911,994.
Patented Feb. 9, 1909.
5 SHEETS—SHEET 5.
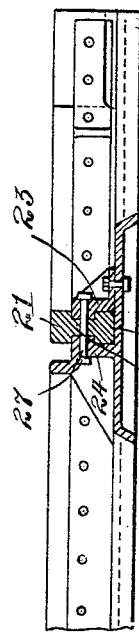
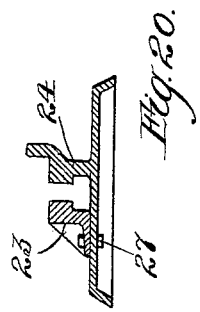
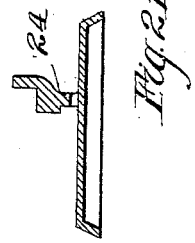
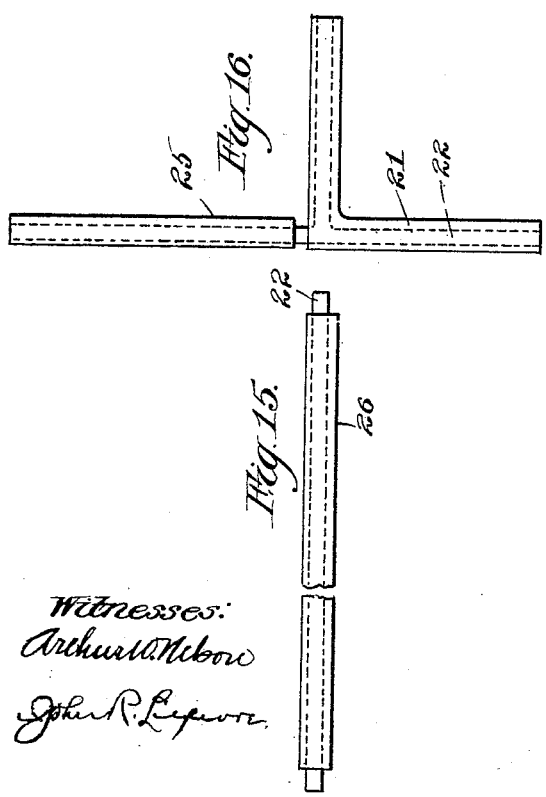
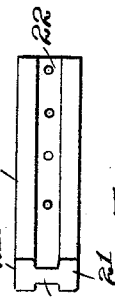
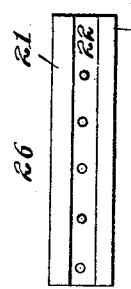
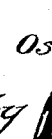
Witnesses:
Arthur O. Nelson
John R. Lepore
Inventor:
Oswald F. Jordan
by
Atty.

UNITED STATES PATENT OFFICE.

OSWALD F. JORDAN, OF CHICAGO, ILLINOIS.

RAILWAY-CROSSING.

No. 911,994.           Specification of Letters Patent.           Patented Feb. 9, 1909.

Application filed December 4, 1908. Serial No. 465,936.

*To all whom it may concern:*

Be it known that I, OSWALD F. JORDAN, a citizen of the United States, and a resident of the city of Chicago, county of Cook, and State of Illinois, have invented certain new and useful Improvements in Railway-Crossings, of which the following is a specification.

My invention relates to improvements in railway crossings and has special reference to improvements in crossings which comprise a body portion that contains removable or renewable, hard metal inserts.

Owing to the breaks provided at the junction point of crossing rails at the points of their intersection, to accommodate the flanges of the wheels of the rolling stock, it is necessary to stoutly reinforce the rails in order that the structure shall remain rigid even after a long period of use. And it is also desirable to reduce, as far as possible, the gaps between the ends of the rail sections to the end that the pounding of the wheels shall be reduced to a minimum, and as railway crossings are subjected to most severe strains and wear and are at best difficult and expensive to maintain, it is usual to make the parts which are subjected to the greatest wear of tougher or harder metal to reduce the number of times it is necessary to repair them in a given period.

The object of my invention is to provide a railway crossing that shall be extremely rigid; that shall contain only small gaps between the rail sections or parts of the crossing; and, which shall be provided with inserts that will withstand wear more successfully than ordinary rails and which may be readily removed and replaced by new inserts when required.

I have observed that one of the chief causes of the rapid breaking down of, and wear in railway crossings lies in the wooden ties which are relied upon to support them and a special object of this invention is to provide a railway crossing which shall be complete in itself; which shall be adapted to rest directly upon the road ballast, and by the use of which both wooden and metal ties may be dispensed with.

Other objects of my invention will appear hereinafter.

The invention consists generally in a railway crossing comprising a single casting containing grooves for the reception of wheel flanges and preferably containing removable inserts which constitute continuations of the heads or tread portions of respective abutting line-rails.

My invention also consists in a railway crossing comprising a single metal plate formed to rest upon the road ballast and to be tamped after the manner of ties, in combination with suitable rail-line extensions arranged on said plate.

The invention also consists in a railway crossing having insert holding members or parts, and inserts, both of novel form and arrangement.

Further the invention consists in various details of construction and in combinations of parts, all as hereinafter described and particularly pointed out in the appended claims.

My invention will be more readily understood by reference to the accompanying drawings, forming part of this specification and in which:

Figure 1 is a plan view of a railroad crossing embodying my invention, half of the same being shown in section on two different planes, viz. the quarter, A A, is a section on the line, $a$—$a$, of Fig. 2; the quarter, X X, is a section on the line, $x$—$x$, of Fig. 2. Fig. 2 is an enlarged side elevation of the railroad crossing. Fig. 3 is a plan view of substantially one-fourth of the railroad crossing, the inserts being removed. Fig. 4 is a cross section on the line, $d$—$d$, of Fig. 3. Figs 5 and 6 are plan and side elevations on one of the four removable inserts. Fig. 7 is a section on the line, $y$—$y$, of Fig. 1. Fig. 8 is a section on the line, $b$—$b$, of Fig. 1. Fig. 9 is a section on the line, $c$—$c$, of Fig. 3. Fig. 10 is the bottom plan view of the railroad crossing shown in Fig. 1. Fig. 11 is a partial plan view of one-quarter of a modified form of the railroad crossing, the insert and the removable corner member having been removed. Fig. 12 is a side elevation of the same. Fig. 13 is a plan view of the removable rail supporting member or corner piece belonging to the device shown in Fig. 11. Fig. 14 is a plan view showing the railroad crossing of Fig. 11 in completed form *i. e.* with insert and corner piece in place. Figs. 15 and 16 are plan views of a pair of inserts of the modified form used in the Fig. 11 device. Figs. 17 and 18 are side elevations of the same. Fig. 19 is a vertical section on the line, $u$—$u$, of Fig. 14. Fig. 20 is a section on the line, $e$—$e$, of Fig. 14; and Fig. 21 is a similar section on the line, $f$—$f$, of Fig. 11, the corner piece being removed.

Primarily, my device is a single metal bed-piece or casting bearing the crossing or meeting rails and adapted to rest upon the road bed or ballast in lieu of ties, after the manner of old fashioned sleepers, and adapted to be tamped, just as ties are tamped. In all of its forms, the device comprises at least two intersecting rail supporting plates which merge, i. e. are integral, where the crossing or meeting rails come together; and the ends of these plates are formed to receive and hold the ends of corresponding line rails. The rail sections carried by the bed plate and the parts by which they are secured thereto may be formed in many different ways. The crossing rails may be integral with the plate, but I prefer that they shall be in the form of inserts which are made of metal that is better adapted to withstand wheel blows and wear. In most cases I prefer that the guard rail portions of the crossings shall be integral with the bed or foundation member and as a rule I provide other portions which are also integral with the bed and which co-act with the guard rail portions to secure the inserts in place. But as explained hereinafter, certain of the rail securing sections or parts may be made removable to receive inserts of different cross-sections, that cannot be inserted from the top without removing some of the holding parts.

An understanding of no more than is shown in the drawings makes it evident that my invention is capable of considerable modification and alteration to suit different conditions and requirements of meeting or crossing rails; hence I do not limit or confine the invention to the specific structures herein shown and described.

The crossing which is shown in Figs. 1 to 10 has a bed-plate or foundation member which is rectangular, the same substantially conforming to the lines of an ordinary right-angled railway crossing in which the two rails of one track cross two rails of another track at right angles. It will be understood that both the form of the bed-plate and the width of its component parts are determined by the number and disposition of the crossing or meeting rails. The bed-plate as best shown in Figs. 1 and 10, is a single casting which contains a rectangular central hole and is provided with projecting ends. It may be said to comprise a quadruple cross in which the abutting arms are integral, but it may be better described as being made up of four plates or wide bars arranged in the same horizontal plane to rest or bear upon the road-bed and of such area as to be capable of supporting the weight imposed on the rails without recourse to cross ties. The length of the plates exceeds the width of the track and hence the ends of the plate project beyond the intersection points and provide bearings for the abutting ends of the line rails, as depicted in Fig. 1 wherein 1, 1 represent such rails. This is a feature which is observed in all forms of my invention. These wide plates are integral at the points of intersection and the plate as a whole is strengthened by depending flanges. As a rule but two flanges are used and they flare outwardly as shown in the several sectional views (Figs. 4, 7, 8, 9, 19, 20, and 21). The outer flange 2 follows the outline of the plate and forms the margin thereof. The inner flange 2' borders the opening in the plate. These flanges are not so deep as to prevent the tamping of the several parts of the plate and yet serve to prevent the displacement of the plate on the road-bed. The flanges are best shown in Fig. 10 which depicts the appearance of the bottom of the plate. I strengthen the plate against possible deflection by means of a suitable number of cross ribs 2'' on the bottom thereof.

The relative width of the rail bearing portions of the device appears in Figs. 1 and 2, wherein comparison may be made with the width of the bases of the line rails 1. The ties of the adjoining track sections, which support the line rails closely approach respective ends of the plate as indicated by the tie 1' in Figs. 1 and 10. The ends of the line rails extend over and rest upon the ends of the plate and the gaps in the line rails are closed by the rail sections on the plate, about to be described. It will be noted that each part of the plate, considering it as made up of four cross plates, serves as a sleeper for its rail and also serves as a cross tie for the two rails that cross it. Thus each part of the plate serves to support its own rail section and also ties together the two crossing rails. The ends of each pair of line rails are tied together by respective ends or projections on the plate.

Upon the top of the plate are the parts which directly support and secure the rail sections or inserts. Certain of these parts also constitute the guard rails. Their height and the height of the inserts is determined by the height of the main line rails. In crossings of the kind shown in Figs. 1 to 10, I prefer to use four inserts or rail sections, each in the form of a cross and constituting the intersections of two rails. These inserts are formed of harder or tougher metal than the remainder of the device and they are severally interchangeable so that parts which have served as continuations of the main line rails long enough to become slightly worn may be reversed and used for cross line extensions or continuations. The tops of the inserts are of substantially the same width and height as the heads of the line rails, while the lower parts or depending webs are made thinner to provide suitable bearing shoulders that rest upon the supporting member. One of the cross-like inserts is shown in Figs. 5 and 6 from which it will be seen to comprise the right angled portion, 3, and the two extensions, 3′, 3′. The angle, 3, forms the junction of two rails, while the parts, 3′, are extensions of respective arms of the angle. The head portions, 4, of the parts, 3, 3′, are separated by the flange notches or grooves, 4′, and said head portions, preferably, are joined only by the thinner integral web portions, 5. The bearing shoulders, 6 and 7, before alluded to, will be noted in Fig. 6. The lower edges, 5′, of the webs preferably rest on the top of the sustaining plate, while the shoulders, 6 and 7, bear on the upper edges of the uprising portions, about to be described. (See Figs. 7 and 8).

The uprising or upright portions together with suitable bolts or rivets, serve to rigidly secure the inserts upon the bed plate and to hold them in alinement with respective line rails. Each web portion (of each insert) is preferably arranged between two of the upright portions or ribs on the plate and said ribs rise into engagement with the shoulders, 6 and 7, thereof; and one of said ribs, in each case, is extended upwardly to form a guard rail at the inner side of the head or tread portion of the insert. The rail sections or inserts are preferably arranged upon or above the middle axes of respective plate portions and the uprising or upright ribs are placed on opposite sides of these axes to embrace the web portions of the inserts, as clearly shown by the several sectional views. Obviously slots or grooves are formed between the several parallel ribs and these grooves open into one another, i. e. intersect at the corners as required to receive the cross-like inserts. The upstanding portions or ribs, 8, 8, 8, 8, frame the central opening in the casting. They unite at the corners and are integral with the bed-plate. The ribs, 9, 9, 9, 9, parallel respective ribs, 8, and unite with the short ribs, 10, which latter are in effect continuations of respective ribs, 8. The ribs, 9 and 10 are also integral with the bed-plate. 11—11 are pairs of corner ribs also integral with the bed-plates and forming in effect continuations of respective ribs, 9, the same paralleling the short ribs, 10. The grooves, 12, before alluded to between the parallel ribs have walls which are preferably machine finished to snugly fit the webs of the inserts and the tops of the ribs, 8 and 9, are preferably ground off to form proper seats for the shoulders of the inserts. The ribs or portions 9 and 11, terminate at the shoulders of the inserts while the ribs, 8 and 10, are provided with off set flanges, 8′, which constitute the guard rails before mentioned. It will be noted that the flanges or guard rails, 8′, are spaced away from the inner sides of the insert heads forming the wheel flange grooves, 4″, which correspond with the notches, 4′, in the inserts. As the intersecting or corner parts of the upstanding ribs are subjected to the most severe wheel blows, I prefer to thicken or reinforce them at the corners, as shown in Fig. 1. (See thickened or reinforced corners, 8″, 9″, and 11″.) And to further reinforce and strengthen the plate, I employ the diagonal braces, 13, four in number at each intersection and integral with the ribs and the plate.

The inserts, as shown in Figs. 1 and 2, stop short of the ends of the bed-plate, while the ribs 10 and 11, extend to the extreme ends at which points they are reinforced by integral end braces, 14. 15—15 are intermediate braces which strengthen the ribs, 11, at the points where the line rails abut or meet the inserts. The ribs, 10, are sufficiently reinforced or braced by their offset guard rail portions.

Referring to Figs. 2 and 9 it will be noted that the end braces, 14, contain a T shaped opening, 16, of a size to admit the end of a line rail between the parallel ribs or flanges 10 and 11, in each case. It will also be noted that slots, 17, are formed in the ends of the ribs, 10 and 11, to accommodate the base flanges of the line rails, which being thus admitted rest upon the end portions or seats, 18, on the plate. The ribs, 10 and 11, in each case, may directly engage the web of the rail; but as the groove or space between said ribs is usually wider than the rail web, I prefer to employ fillers or shims, 1″, to fill the spaces and to center the rail web between ribs, 10 and 11. (See Fig. 1.) As shown in Figs. 1 and 2, the ends, 10′, of the guard rail sections, 10, are beveled or flared inwardly, the wheel flange grooves being thus widened or flared at the ends, for the easy reception of the wheel flanges.

As stated the inserts snugly fit the holding parts or ribs and the latter prevent the horizontal displacement thereof. To secure the inserts against vertical displacement, I employ a large number of bolts, 19, which, as shown in Figs. 1, 2, 7 and 8, extend through the webs of the inserts and through the embracing portions or ribs. Similar bolts, 20, are similarly used in securing the ends of the line rails between the extended ends of the holding ribs, the same extending through the ribs 10 and 11, and the rail web and the shims, 1″. Rivets or other clamping means may be substituted for the bolts herein shown.

The crossing which is shown in Figs. 1 to 10, is characterized by the inserts having the thin straight webs, 5, which may be inserted from the top and which allow the upstanding ribs to be integral with the plate. I desire, however, that it be understood that one or the other of the rib portions, 9 and 11, may be separable from the plate and in cases where special care is not used in fitting the inserts to the grooves, this construction is preferred, as it permits the positive clamping of the ribs upon the insert webs by means of the bolts, 19. A construction in which this feature of my invention appears is detailed in Figs. 11 to 21, wherein I have also shown inserts which are not only interchangeable but are also invertible. The construction is altered only in so far as required by the changed cross section of the insert. Instead of the single head and the straight web, I here employ double headed inserts of the cross section shown in Figs. 19 and 18, 21—21 being the head portions and 22 the web portion. The inner faces of the embracing ribs, 23 and 24 on the plate are formed to fit the sides of the insert and the outer portion, 23, is separable from the plate. The sections depicted in Figs. 19 and 20 are characteristic of all parts of the modified crossing, but the rib portions need be removable only at the corners of the crossing as shown in Figs. 11 and 14. These figures disclose only a quarter of the crossing but serve to represent a complete crossing of the general outlines of Fig. 1. In this construction I employ four T shaped inserts, 25, and two straight inserts, 26, all of the double headed cross section. The members of ribs, 24' and 23' are preferably integral with the bed-plate, whereas the corner angle member, 23, is a separate part that is secured to the bed by a number of short bolts, 27. In assembling the crossing I first ship or drive the straight inserts, 26, between their holding ribs and then push the long arm of the insert, 25, into place. The inserts, 25, when thus placed serve to lock the straight sections. Afterward the corner members, 23, are put in place as shown in Fig. 14 and all parts are fastened permanently by the cross bolts. Except in these particulars the crossing shown in Figs. 11 to 21 is the same as that shown in Figs. 1 to 10.

Crossings and other rail supporting and securing devices which embody my invention possess the advantages of rigidity, fixity, durability and reliability and may be easily repaired.

Having thus described my invention, I claim as new and desire to secure by Letters Patent:

1. A substitute for cross ties at railway crossings comprising a single metal plate adapted to be tamped as ties are tamped, in combination with four crossed rails thereon, said plate having integral grooved rail holding guard portions and line-rail end fasteners on the ends of said plate, substantially as described.

2. A substitute for cross ties at railway crossings comprising a single metal plate adapted to be tamped as ties are tamped, in combination with four crossed rails thereon, said plate having integral grooved rail holding guard portions and line-rail end fasteners on the ends of said plate and integral with said rail holding portions, substantially as described.

3. A railway crossing comprising a single plate made up of four crossed integral plate portions, in combination with inserts thereon, line-rail end fastenings at the ends of said plate and said plate being adapted to rest upon the road bed and being of such width as to support the weight of rolling stock, in lieu of ties, substantially as described.

4. A railway crossing comprising a wide plate adapted to rest upon the road bed and support the weight of rolling stock, in lieu of ties, and having crossed intersecting grooves, cross-like inserts held in said grooves and line-rail end fasteners at the ends of said plate, alined with respective portions of said inserts, substantially as described.

5. A railway crossing comprising a single plate adapted to rest upon the road bed in lieu of ties or timbers and arranged to be tamped after the manner of ties, in combination with four crossing rail inserts secured to said plate and line-rails having their ends supported by said plate, substantially as described.

6. A railway crossing comprising a single casting adapted to rest upon the road bed, in lieu of ties, containing grooves for the reception of wheel flanges and provided with line-rail continuations or tread portions, also guard rail portions and line-rail end fasteners on said plate, substantially as described.

7. A railway crossing comprising a single load supporting metal plate formed to rest upon the road bed and having a central opening, in combination with four crossing rails arranged upon said plate and of less length and line-rail end fasteners on said plate at the ends of respective crossing rails, substantially as described.

8. A railway crossing comprising a single metal plate formed to rest upon the road bed and having a central opening, in combination with cross-like rail inserts arranged upon said plate and line-rail end fastenings upon the ends of said plate at the ends of said inserts, substantially as described.

9. A railway crossing comprising suitably formed crossing rails and a single member or plate whereon said rails are arranged, said plate, in lieu of ties, being adapted to rest upon the road bed and sustain the weight imposed on said rails, said rails being shorter than the plate, and line-rail end fastenings on the ends of said plate, substantially as described.

10. A railway crossing comprising a plurality of integral crossed or intersecting plates adapted to rest upon the road bed and sustain the weight of rolling stock and respective crossing rails arranged upon said plates, substantially as described.

11. A railway crossing comprising a plurality of crossed or intersecting integral plates in substantially the same horizontal plane and having depending flanges, in combination with crossing rails fixed upon said plates, substantially as described.

12. A railway crossing comprising a plurality of crossed or intersecting load sustaining plates in substantially the same horizontal plane and having depending flanges, in combination with crosing rails fixed upon said plates and guard rails also fixed thereon, substantially as described.

13. A substitute for cross ties comprising a plurality of crossed or intersecting integral plates in substantially the same horizontal plane, to rest on the road bed, in combination with crossing rails fixed upon said plates and guard rails also fixed thereon, substantially as described.

14. A substitute for cross ties comprising a plurality of crossed or intersecting integral plates in substantially the same horizontal plane, adapted to rest on the road bed and to be tamped as ordinary ties are tamped, in combination with crossing rails fixed upon said plates and guard rails integral therewith, substantially as described.

15. A railway crossing comprising a plurality of crossed integral intersecting plates in substantially the same horizontal plane, in combination with crossing rails, rail fastening means integral with said plates and guard rails also integral therewith, substantially as described.

16. A railway crossing comprising a plurality of integral plates intersecting in substantially the same horizontal plane, pairs of rails intersecting upon said plates and guard rails parallel therewith, substantially as described.

17. A railway crossing comprising a plurality of integral plates intersecting in substantially the same horizontal plane, pairs of rails intersecting upon said plates and guard rails parallel therewith and line-rail end fasteners integral with said guard rails, substantially as described.

18. A railway crossing comprising a foundation member or plate adapted to rest upon the roadway and sustain the weight of rolling stock, integral, grooved insert-holding portions upon the top of the plate, cross forming inserts held thereby and integral rail end fastening means at the ends of said grooved portions, substantially as described.

19. In a device of the class described, a wide plate adapted to rest upon the road bed and support the weight of rolling stock, in lieu of cross ties, in combination with integral up-standing portions on said plate, rail inserts resting upon and secured to said up-standing portions, substantially as described.

20. In a device of the class described, a wide plate adapted to rest upon the road bed and support the weight of rolling stock, in lieu of cross ties, in combination with integral up-standing portions on said plate, rail inserts resting upon and secured to said up-standing portions, the ends of said up-standing portions constituting line-rail end fasteners, substantially as described.

21. In a device of the class described, a wide plate adapted to rest upon the road bed and support the weight of rolling stock, in lieu of cross ties, in combination with up-standing portions on said plate, line rail end fastenings at the ends of said plate, rail inserts resting upon said up-standing portions and horizontal bolts securing said inserts to said up-standing portions, substantially as described.

22. In a device of the class described, a foundation plate or member having integral up-standing portions and rail inserts resting upon said portions and having depending webs secured between the same, substantially as described.

23. A railway crossing comprising a foundation plate or member constituting a substitute for cross ties, in combination with up-standing portions on said plate, containing intersecting grooves, rail end fasteners on the plate at the ends of respective grooves and interchangeable cross-like rail inserts held in said grooves, substantially as described.

24. A railway crossing comprising a foundation plate or member constituting a substitute for cross ties, in combination with up-standing portions on said plate containing intersecting grooves, rail end fasteners on the plate at the ends of respective grooves and interchangeable cross-like rail inserts having depending webs held in said grooves, substantially as described.

25. A railway crossing comprising a single foundation plate or member constituting a substitute for cross ties and provided with integral up-standing portions, in combination with removable up-standing portions, rail inserts having webs held by said up-standing portions, substantially as described.

26. A railway crossing comprising a single foundation plate or member constituting a substitute for cross ties and provided with integral upstanding portions, in combination with removable up-standing portions, rail inserts having webs held by said up-standing portions and line-rail end fasteners being formed upon the ends of said plate, substantially as described.

27. A railway crossing comprising a single foundation plate or member provided with depending flanges and adapted to rest upon the road bed in lieu of ties, in combination with upstanding portions on said member, crossing rail inserts having webs secured to said upstanding portions, the ends of said plate and the ends of said up-standing portions forming line-rail end fastenings, substantially as described.

28. A railway crossing comprising a single foundation member or casting adapted to rest upon the road bed and to be tamped, in lieu of cross ties, integral upstanding guard rail forming portions on said plate, coöperating up-standing portions on the plate, rail inserts held by said up-standing portions and line rail end fastenings on said plate at the ends of said inserts, substantially as described.

29. A railway crossing comprising a foundation plate or member having integral up-standing portions and integral guard rail portions, in combination with double headed invertible, interchangeable inserts secured to said up-standing portions and suitable line-rail end fasteners on said plate at the ends of said inserts, substantially as described.

In testimony whereof, I have hereunto set my hand, this 28th day of November, 1908, in the presence of two subscribing witnesses.

OSWALD F. JORDAN.

Witnesses:
M. SIMON,
JOHN R. LEFEVRE.